United States Patent [19]
Edele et al.

[11] Patent Number: 5,647,085
[45] Date of Patent: Jul. 15, 1997

[54] WIPER ARRANGEMENT WITH A ROTATABLE WIPER ARM IN ADDITION TO THE RECIPROCATING MOVEMENT

[75] Inventors: Reinhard Edele, Bietigheim-Bissingen; Eckhardt Schmid, Brackenheim, both of Germany

[73] Assignee: ITT Automotive Europe GmbH, Germany

[21] Appl. No.: 525,770

[22] PCT Filed: Mar. 9, 1994

[86] PCT No.: PCT/EP94/00720

§ 371 Date: Sep. 26, 1995

§ 102(e) Date: Sep. 26, 1995

[87] PCT Pub. No.: WO94/22696

PCT Pub. Date: Oct. 13, 1994

[30] Foreign Application Priority Data

Mar. 27, 1993 [DE] Germany .................. 43 10 041.4

[51] Int. Cl.⁶ .................................................. B60S 1/34
[52] U.S. Cl. .......................... 15/250.21; 15/250.34; 15/250.31; 74/570; 74/96
[58] Field of Search .............. 15/250.34, 250.21, 15/250.23, 250.202, 250.351, 250.352, 250.31; 74/570, 96, 567, 569

[56] References Cited

U.S. PATENT DOCUMENTS

| | | | |
|---|---|---|---|
| 2,412,319 | 12/1946 | Carey | 15/250.21 |
| 2,533,963 | 12/1950 | Sacchini | 15/250.21 |
| 2,878,506 | 3/1959 | Krohm | 15/250.21 |
| 4,546,518 | 10/1985 | Harbison et al. | 15/250.23 |
| 5,033,157 | 7/1991 | Von Meltzing et al. | 15/250.23 |

FOREIGN PATENT DOCUMENTS

| | | | |
|---|---|---|---|
| 0021914 | 1/1981 | European Pat. Off. . | |
| 2488558 | 2/1982 | France | 15/250.202 |
| 2625715 | 7/1989 | France . | |
| 3329146 | 2/1985 | Germany | 15/250.34 |
| 3900525 | 7/1989 | Germany . | |
| 4224861 | 2/1994 | Germany | 15/250.34 |
| 4307995 | 9/1994 | Germany | 15/250.351 |
| 59-75352 | 5/1984 | Japan . | |
| 60-122266 | 8/1985 | Japan . | |
| 187637 | 8/1987 | Japan | 15/250.351 |

*Primary Examiner*—Gary K. Graham
*Attorney, Agent, or Firm*—J. Gordon Lewis; Thomas N. Twomey

[57] ABSTRACT

A wiper arrangement for windscreen wipers in motor vehicles in which the wiper blade is rotated, depending on the pivoting angle of the wiper arm thus conforming to the curvature of the windscreen. The entire wiper arm rotates to a certain degree as the wiper spindle pivots depending on the pivoting angle. The crank control which is fitted in a control sleeve embracing a spherical cap on the wiper spindle and being rotatable in relation thereto. The control sleeve is controlled by a circumferential control edge on the bearing sleeve of the wiper shaft.

5 Claims, 2 Drawing Sheets

WIPER ARRANGEMENT WITH A ROTATABLE WIPER ARM IN ADDITION TO THE RECIPROCATING MOVEMENT

TECHNICAL FIELD

The present invention relates to wiper arrangements, and more particularly to wiper arms in which the position of the wiper blade is adjustable in accordance with the curvature of the windscreen to be cleaned.

BACKGROUND OF THE INVENTION

The requirement of an angular adjustability of the wiper blade is increasingly imposed in view of the fact that windscreens more frequently are designed curved to minimize the air resistance coefficient of automotive vehicles. To adjust the angular position of the wiper blade, a multiplicity of solutions has been offered in which, on the one hand, the wiper blade itself is adjusted with respect to the wiper arm while, on the other hand, one end section of the wiper arm is rotated with respect to the remainder of the mounting section.

DE-OS 3 900 525 teaches to provide a means for fixing the wiper arm to the wiper spindle which is pivoted along with the wiper spindle, thereby also causing a reciprocating movement of the remainder of the wiper arm. In addition, the remainder of the wiper arm is rotatably arranged within the mounting means, with the remainder of the wiper arm during its oscillating movement being rotated by a corresponding crank control. The disadvantage of this arrangement is that the section of the wiper arm associated to the wiper spindle is divided into two oppositely movable parts requiring enhanced mechanical efforts. Moreover, the prior known construction regarding the rotating movement of the wiper arm permits only relatively short force levers.

FR 2 625 715 discloses a wiper arrangement in which the reciprocating pivotal movement of the wiper arm about the axis of the wiper spindle is superimposed by an additional reciprocating rotary movement of the wiper arm about the longitudinal axis thereof. The wiper arm is fixed to a control part, which by means of another component secured to the wiper spindle, is pivoted about the axis of the wiper spindle and at the same time is pivotally rotated by moving a control curve about the longitudinal axis of the wiper arm. The disadvantage of this solution resides in the bearing points of the control part which are exposed to very high loads because all forces transferred to the wiper arm travel exclusively through the bearing points (the bearing points are required to accommodate all counter-forces of the wiper arm).

SUMMARY OF THE INVENTION

The object of the invention is to provide a simpler wiper arrangement of this type and to reduce the number of required components.

This object is fulfilled in that the section of the wiper arm is not divided into one part only pivotable and another part pivotable and rotatable but rather in that the entire wiper arm is not only pivotable but also rotatable in a direction vertical to the reciprocating movement.

In view of the fact that a spherical ring is secured to the wiper spindle, the spherical outer face of which is embraced by a control sleeve, a relatively large, common bearing surface is formed which is able to withstand relatively high loads. Moreover, the geometry of this spherical bearings face ensures a reliable control of the wiper arm connected to the control sleeve.

Once the wiper arm is connected to the spherical ring by means of two journals arranged on the longitudinal axis of the wiper arm and radially extending through the control sleeve, a very safe connection is established between the wiper spindle and the wiper arms so that relatively high torques can be initiated in the pivoting plane of the wiper arm. If one end of a journal is provided in an axial recess of the wiper arm while the other end is arranged in a radial recess of the spherical ring, a relatively easy assembly of the individual components is permitted.

To increase the leverage for applying the force required for the rotating movement about the longitudinal axis of the wiper arm, it is preferred that the control disk is formed with a control curve by radially projecting the circumferential edge of the control disk onto the bearing sleeve for the wiper spindle. The control disk can be arranged at a suitable distance from the longitudinal axis of the wiper arm, with the control disk being united to the bearing sleeve of the wiper spindle such that this component simultaneously performs a plurality of functions. Preferably the edge of the control disk is circumferentially disposed at a suitable point of the bearing sleeve depending on the desired distance from the axis of rotation of the wiper arm.

In a preferred embodiment of the present invention, the inner face of the wiper bearings (associated with the control disk) is designed to be uniform with the control sleeve such that the characteristics of the reciprocating rotary motion of the wiper arm about the longitudinal axis thereof can be adapted to the curvature of the windscreen to the wiped.

DETAILED DESCRIPTION OF THE PREFERRED EMBODIMENT

Figure 1:
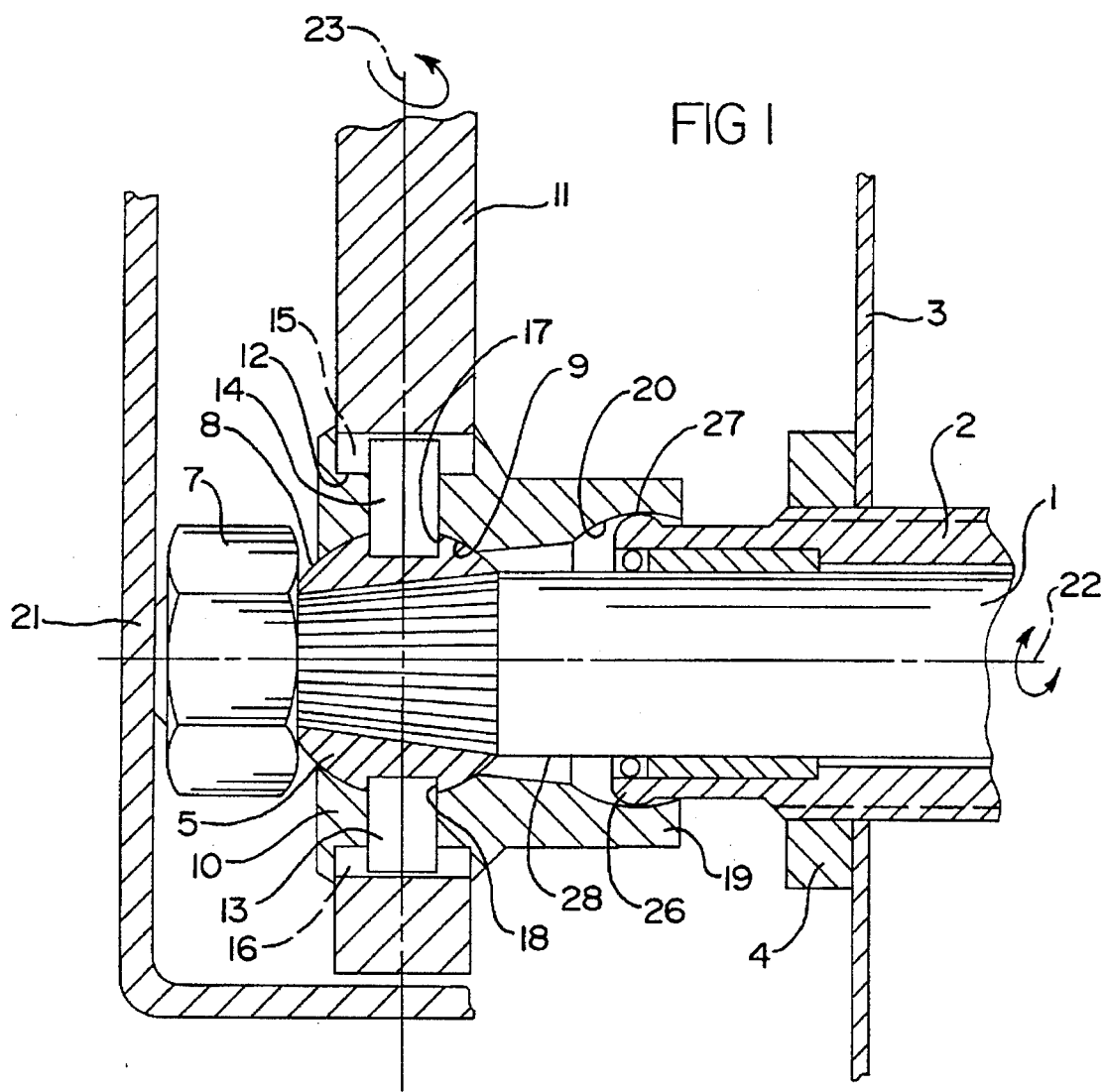
FIG. 1 is a sectional view of one form of embodiment of the invention.

Now, referring to the drawing, FIG. 1 shows a wiper spindle 1 rotating, in a reciprocating way, about a longitudinal or pivot axis 22 of the spindle. The spindle 1 is provided in a bearing sleeve 2 attached by nut 4 to a chassis plate 3, thereby being fixed thereagainst. Plugged onto the wiper spindle 1 is a spherical ring 5 the outer face of which forms a spherical zone. The ring itself, by keying to the spindle and by screwing through nut 7, is detachably fixed to the spindle. The spherical face 8 of the spherical ring 5 is embraced by a corresponding concave inner face 9 of a control sleeve 10 accommodating the wiper-side end of a wiper arm 11. A wiper blade 6 is disposed at an end of arm 11. The wiper arm 11 includes an accommodating bore 12 embracing the outer cylindrical surface of the control sleeve 10. Two journals 13,14 radially extending through the accommodating sleeve 10 and protruding into suitable axial recesses 15,16 and 17,18, respectively, of the wiper arm 11 (in a manner adjacent the accommodating bore 12) and of the spherical face 8 of the spherical ring 5, respectively, insure that the wiper arm 11 toward the spherical ring 5 and, hence, toward the wiper spindle 1 is locked against rotation about the longitudinal axis 22, thereby causing the wiper arm 11 to espouse, in the direction of rotation of the axis of rotation 22, the reciprocating movement of the wiper spindle 1.

Figure 2:
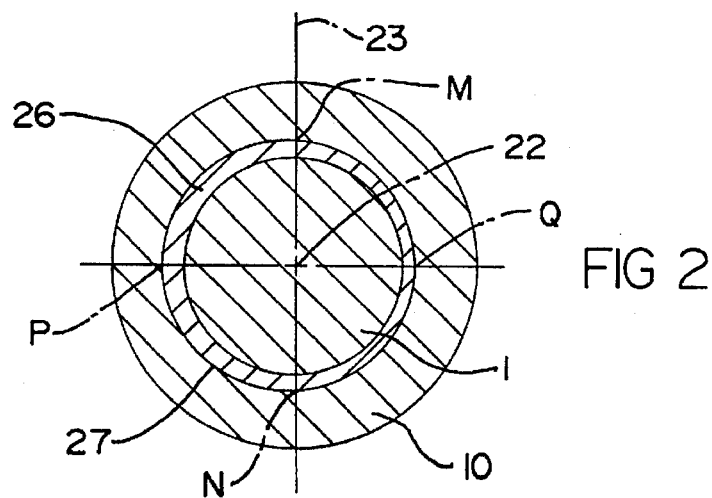
FIG. 2 is a sectional illustration of another view of the example of embodiment of FIG. 1.
Figure 3:
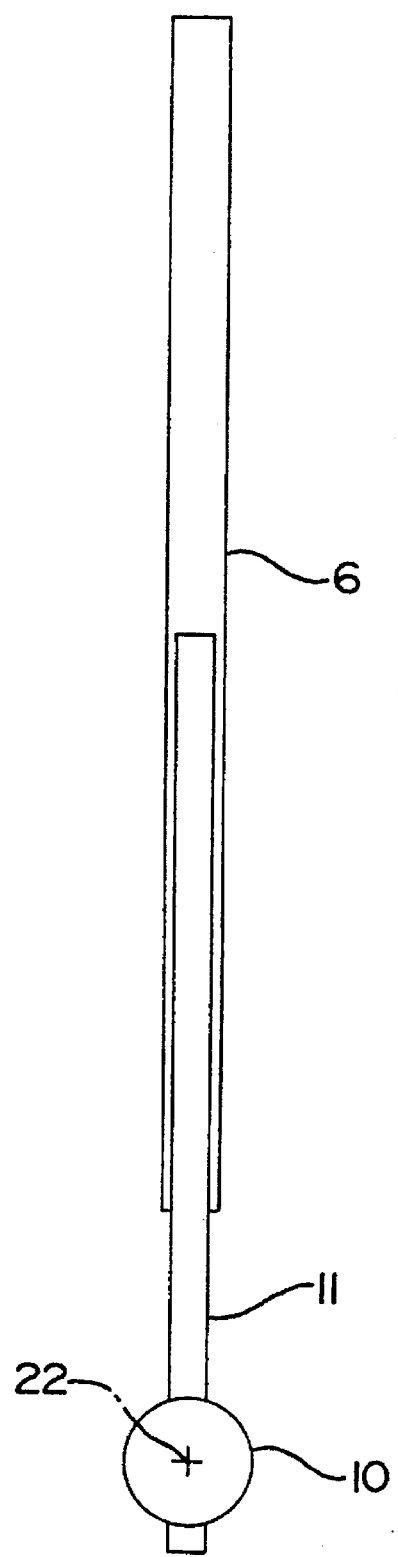
FIG. 3 is a schematic illustration of a wiper blade attached to a wiper arm.

However, the journal mounting means also permits a rotation of the wiper arm 11 over the spherical ring 5 and, hence, over the wiper spindle 1, about the axis of rotation 23 as shown in phantom in FIG. 4. Under the action of the cylindrical journal 13,14, during the pivot movement of the wiper arm 11 about the axis of rotation 23, the control sleeve 10 is simultaneously pivoted about the said axis. Thus the control sleeve 10 in connection with the wiper arm 11 is able to perform a joint limited rotary movement about the axis of rotation 23. Conversely, this means that a rotary movement of the control sleeve 10 about the axis of rotation 23 at the same time results in a corresponding rotary movement of the wiper arm 11. This limited rotary movement is caused by a circumferential control edge 26 on the upper end of the bearing sleeve 2. The circular outer edge 27 of the circumferential edge 26 is eccentric over the circular circumference 28 of the spindle 1. In the drawing, the section is so selected that the respectively visible point of intersection between the edge 27 and the plane of the drawing is at the same distance from the longitudinal axis 22. In FIG. 2, these are the two points M and N. However, FIG. 2 conveys that the corresponding points of intersection P, Q in case of a section in a direction vertical to the viewer's plane along the pivot axis 22, respectively are at a different distance from the pivot axis 22. This means that in a pivot movement of the control sleeve 10 along with the wiper spindle 1, the open end 19 at the same time is rotated, in a reciprocating way, by a small angular area about the axis of rotation 23 as shown in FIG. 4.

Hence, the inner face of the open end 19 of the control sleeve 10 in conjunction with the outer edge 27 acts as a control crank to generate the rotary movement of the control sleeve 10 and, hence, of the wiper arm 11. The crank control can, of course, also be so designed that the wiper arm 11 performs a rotary movement less steadily dependent on the reciprocating movement of the spindle 1. For this purpose, only the contour of the outer edge 27 will have to be changed accordingly. Another advantageous alternative resides in that the contour of the outer edge 27 over the pivot axis 22 is formed centrally while the associated inner face 20 at the open end of the control sleeve 10 is configured so eccentrically that the control sleeve, depending on the pivoting position of the spindle 1, is given the desired rotary position. The advantage involved therewith, in particular, resides in that an otherwise unchanged wiper arrangement by correspondingly designed control sleeves 10 can be easily adapted to the curvature of the respective type of windscreen with no need to change the design of the spindle 1 or of the stationary bearing sleeve 2.

The invention involves the additional advantage that wiper arm 11, control sleeve 10 and spherical ring 5 can be premanufactured, stored and handled as a unit, thereby enabling the otherwise identical wiper arrangement to be easily adapted to various types of windscreens. To protect the wiper system against contamination and against injuries of operators by otherwise unprotected sharp edges, a protective cap 21 is usually plugged onto the wiper arm, which protective cap performs therewith both the reciprocating and rotary movements.

We claim:

1. A wiper system comprising:

a wiper arm rotatably fixed to a wiper spindle for reciprocating rotary movement therewith about a spindle axis of the wiper spindle and the wiper arm having a longitudinal axis, a control sleeve radially disposed between the wiper spindle and the wiper arm and is rotatably fixed to the wiper arm for unitary rotation therewith, a spherical ring fixed to the wiper spindle having a spherical face which is embraced by a concave inner surface of the control sleeve and the control sleeve being pivotable along with the wiper arm about the longitudinal axis of the wiper arm, with the control sleeve being supported on a control edge of a stationary member fixed to a chassis plate by a force applied in a direction transverse to the spindle axis (A) and transverse to the longitudinal axis of the wiper arm, and a wiper blade connected to the wiper arm wherein the control sleeve is pivoted about the longitudinal axis as a function of its rotative position relative to the control edge, thereby causing the wiper arm to pivot therewith about the longitudinal axis as a function of rotary movement of the wiper arm about the spindle axis.

2. A wiper arrangement according to claim 1, wherein the wiper arm is connected to the spherical ring by means of two journals aligned with the longitudinal axis of the wiper arm and radially extending through the control sleeve and into the spherical ring.

3. A wiper arrangement according to claim 2, wherein the journals each have one end in an axial recess of the wiper arm and another end within a radial recess of the spherical ring.

4. A wiper arrangement according to claim 3, wherein the control edge comprises a radially projecting circumferential edge on a bearing sleeve for the wiper spindle.

5. A wiper arrangement according to claim 4, wherein the bearing sleeve is of a circular design and is concentric to the spindle axis and an inner face of the control sleeve associated with the bearing sleeve is of an eccentric configuration such that it performs the function of the control edge.

* * * * *